E. J. VOSLER.
COMBINED SAFETY VALVE AND PRESSURE GAGE.
APPLICATION FILED JUNE 17, 1915.
1,175,208.
Patented Mar. 14, 1916.
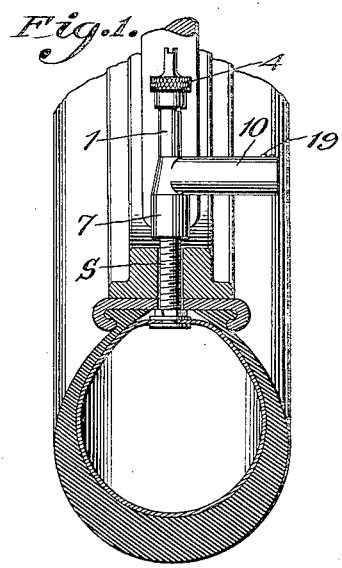
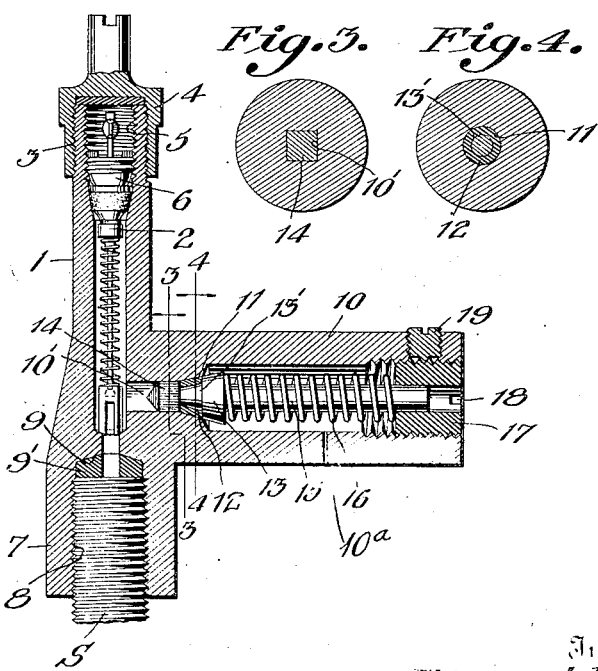
Inventor
Edward J. Vosler.
Witnesses
by
Attorneys

UNITED STATES PATENT OFFICE.

EDWARD J. VOSLER, OF PIQUA, OHIO.

COMBINED SAFETY-VALVE AND PRESSURE-GAGE.

1,175,208.   Specification of Letters Patent.   Patented Mar. 14, 1916.

Application filed June 17, 1915. Serial No. 34,680.

*To all whom it may concern:*

Be it known that I, EDWARD J. VOSLER, a citizen of the United States, residing at Piqua, in the county of Miami and State of Ohio, have invented certain new and useful Improvements in Combined Safety-Valves and Pressure-Gages; and I do declare the following to be a full, clear, and exact description of the invention, such as will enable others skilled in the art to which it appertains to make and use the same.

This invention relates to safety valves and pressure regulating devices, and more particularly to those employed on pneumatic tires.

The object of the invention is to provide an efficient safety valve and pressure regulating device for pneumatic tires which is so constructed that after being set to operate at a predetermined pressure, will automatically control the pressure within the tire so that when said pressure becomes excessive for any reason the valve will automatically operate to relieve it and thus avoid blowouts.

Another object is to provide a device of this character which is simple in construction and composed of only a few parts which may be installed easily and after being once set require no further attention.

With these and other objects in view the invention consists of certain novel features of construction and the combination and arrangement of parts hereinafter fully described and claimed.

In the accompanying drawings: Figure 1 represents a vertical transverse section of a tire showing this combined safety valve and pressure regulator applied and in side elevation; Fig. 2 is an enlarged detail sectional view showing more particularly the valve structure; Fig. 3 is a transverse section taken on line 3—3 of Fig. 2; Fig. 4 is a similar view taken on line 4—4 of Fig. 2.

In the embodiment illustrated, an upright tubular valve casing 1 is shown which is designed to receive the inflating valve 2 which may be of any desired construction, those known as Schrader valves being commonly employed. This tubular casing 1 is externally threaded at its upper end as shown at 3 to receive an ordinary valve cap 4 and is internally threaded as shown at 5 for engagement with the ordinary valve core 6. The lower end of this casing 1 is enlarged as shown at 7 and is internally threaded as shown at 8 for engagement with the valve stem or valve carrying member S that is connected to the inner tube. This enlarged casing end 7 is provided at its inner end with a seat or shoulder 9 having a packing 9' to insure an air tight fit of the casing 1 with the stem S. Extending laterally from the casing 1 and preferably in a plane at right angles thereto is a tubular casing 10 which communicates with the casing 1 and is provided at its inner end with a valve seat 11 against which packing 12 arranged on valve 13 is designed to seat as shown in detail in Fig. 2. This valve 13 has an extension 14 at its front or inner end which is designed to be guided in the inner end of the casing 10 which is reduced and shaped to receive said extension or head 14, as shown at 10' and which is preferably made angular in cross section to prevent the turning of the valve on its seat. Between the head 14 and valve 13 is a neck forming an annular seat 13' to receive the packing 12. This valve 13 has a stem 15 extending rearwardly therefrom and on which is mounted a coiled spring 16 which bears at one end against the enlarged or shouldered end of the valve 13, and at its other end against a hollow screw 17 which has a threaded engagement with the outer end of the tubular casing 10 and is designed to be adjusted within said casing for controlling the tension of said spring, thereby regulating the pressure at which the valve 13 will be opened against the tension of said spring. This hollow screw 17 is provided in its outer end with a kerf 18 for the reception of a screw driver for turning it in either direction, as may be desired. A locking screw 19 extends transversely through the side wall of the casing 10 and is designed to engage the screw 17 and lock it in adjusted position to prevent its accidental turning.

In the use of this invention, the valve core of the ordinary Schrader valve which is usually carried by the stem S, is removed from said stem and placed in the internally threaded casing 1 and then the safety valve is connected with the Schrader valve stem S by engagement of the threaded socket 7 with said stem S. The safety valve 13 is then adjusted to set it to resist a predetermined pressure, by first tightening up the screw 17 as far as it will go; the tire to which the device is applied is then inflated to obtain the desired pressure therein; then the screw 17 is loosened until the air begins to pass out through valve 13 and after this occurs the locking screw 19 is tightened to lock screw 17 in adjusted position. After the parts have been so adjusted, the tire is ready for use and when it is inflated at any time it will take the pressure for which it is set, and when the air pressure therein is increased by heat or otherwise the valve 13 will open and relieve the excessive pressure therein in the manner above described, the excess air passing out of extension 10 through an aperture 10ª. It is to be observed however, that the plug 14 which fits snugly in the reduced portion 10' of the bore of the casing 10, and the valve 13 are allowed a predetermined amount of inward and outward movement before air will be allowed to escape from the tire. This is essential in order that such air may not escape each time air is compressed in the tire by encountering a minor obstruction. Obviously, it would not be advantageous to allow air to be exhausted from the tire each time such an obstruction were encountered.

In applying this improved valve, the lateral tubular extension 10 must be disposed straight to one side of the wheel so that the rotary motion of the wheel will not have any effect on the valve 13.

From the above description it will be obvious that after this device is applied and adjusted as above described, all danger of blowouts of the tires will be avoided and thereby render them much safer than tires not so equipped.

I claim as my invention:—

In combination, a vented tubular valve casing whose bore is decreased in diameter at one end, said casing having at said end means for attaching it to the valve stem of a vehicle tire, a guide in the other end of said casing, an annular valve seat at the juncture of the reduced portion of said bore with the remainder thereof, a valve resting on said seat and having a stem slidable in the aforesaid guide, a spring for closing said valve and preventing opening thereof until a predetermined pressure is exerted thereon from the interior of the tire, and an elongated plug of equal diameter throughout its length projecting from the valve and received snugly yet slidably in the aforesaid reduced portion of the bore, whereby said plug and the valve may move outwardly and inwardly a predetermined amount when the tire encounters minor obstructions without allowing the escape of air from said tire.

In testimony whereof I have hereunto set my hand in presence of two subscribing witnesses.

EDWARD J. VOSLER.

Witnesses:
  WM. FRESHAUR,
  GEO. THOMAYER.